United States Patent von Behren

[11] Patent Number: 5,374,004
[45] Date of Patent: Dec. 20, 1994

[54] LOW-FRICTION, BELT-DRIVEN TAPE CARTRIDGE

[75] Inventor: Robert A. von Behren, Lilydale, Minn.

[73] Assignee: Minnesota Mining and Manufacturing Company, St. Paul, Minn.

[21] Appl. No.: 934,954

[22] Filed: Aug. 25, 1992

[51] Int. Cl.⁵ .............................................. G11B 15/32
[52] U.S. Cl. ............................................... 242/352.4
[58] Field of Search ......................... 242/192; 360/60

[56] References Cited

U.S. PATENT DOCUMENTS

| | | | |
|---|---|---|---|
| 3,114,512 | 12/1963 | Peshel et al. | 242/55.12 |
| 3,305,186 | 2/1967 | Burdorf et al. | 242/55.12 |
| 3,528,626 | 9/1970 | Bumb, Jr. | 242/192 |
| 3,544,038 | 12/1970 | Smith | 242/192 |
| 3,692,255 | 9/1972 | Von Behren | 242/192 |
| 3,802,644 | 4/1974 | Maiershofer | 242/192 |
| 3,808,902 | 5/1974 | Grant | 74/227 |
| 3,907,230 | 9/1975 | Merle et al. | 242/192 |
| 3,942,743 | 3/1976 | Jimsemji | 242/192 |
| 4,054,923 | 10/1977 | Lewis | 360/60 |
| 4,072,279 | 2/1978 | Lewis | 242/192 |
| 4,146,194 | 3/1979 | Majicek | 242/192 |
| 4,159,811 | 7/1979 | Grant | 242/192 |
| 4,162,774 | 7/1979 | Bowers | 242/192 |
| 4,205,808 | 6/1980 | Hurtig et al. | 242/192 |
| 4,209,144 | 6/1980 | Majicek | 242/192 |
| 4,242,709 | 12/1980 | Stricker | 360/96.4 |
| 4,447,019 | 5/1984 | Nagorski | 242/192 |
| 4,474,342 | 10/1984 | Nater | 242/192 |
| 4,575,022 | 3/1986 | Allwine, Jr. et al. | 242/192 |
| 4,688,742 | 8/1987 | Hettich | 242/192 |

FOREIGN PATENT DOCUMENTS 658330 10/1986 Switzerland .

OTHER PUBLICATIONS

Technical Service Product Bulletin #C-0051 (TSPB), "Data Cartridge Theory of Operation," Oct. 8, 1990, R. A. von Behren and D. Argento.

Primary Examiner—Daniel P. Stodola
Assistant Examiner—John Q. Nguyen
Attorney, Agent, or Firm—Gary L. Griswold; Walter N. Kirn; Charles L. Dennis, II

[57] ABSTRACT

The belt of a two-reel tape cartridge is stretchably entrained around the tape packs, a belt driving roller, and a pair of idler rollers, each of which is journalled on a shaft projecting from one end of an arm. The other end of each arm is pivotably mounted in the cartridge so that the idler rollers ride on the belt and are pressed by the belt against the belt and the underlying tape pack.

7 Claims, 2 Drawing Sheets

LOW-FRICTION, BELT-DRIVEN TAPE CARTRIDGE

BACKGROUND OF THE INVENTION

1. Field of the Invention

The invention relates to a two-reel tape cartridge wherein an elastic belt is entrained around the tape packs to drive the tape tangentially.

2. Description of the Related Art

Coassigned U.S. Pat. No. 3,692,255 (Von Behren) discloses a two-reel tape cartridge in which an elastic belt is driven by a reversible motor to drive the tape bidirectionally. The belt is stretchably entrained around the tape packs, a belt driving roller, and a pair of idler rollers (e.g., belt guide rollers 21 and 22 of FIGS. 1-2) that are journalled on stationary pins in the corners of the cartridge. A predetermined frictional coupling between the idler rollers and their pins applies a predetermined drag to the belt so that the belt drives the tape faster at the take-up pack than it does at the supply pack, thus applying tension to the tape and taking up any slack that might otherwise develop in the tape between the reel hubs.

Because tape cartridges of the Von Behren patent are used for recording data, they are commonly called "data cartridges." They are currently in widespread use on devices that drive the tape at speeds from 30 inches per second (0.8 m/sec), to more than 100 inches per second (2.5 m/sec). Substantially higher tape speeds would require increased drive motor power and involve a tendency for slippage due to air entrapment between the belt and the convolutions of tape. These increased demands would encroach on the margins for safe operation of the cartridge. Furthermore, the higher ambient heat generated by increased motor sizes and drag at the idler rollers could expose the belt to higher temperatures, thus shortening its useful life.

In a second type of belt-driven, two-reel tape cartridge, frictional drag is reduced by avoiding the use of journalled idler rollers. Instead, a floating roller is squeezed against the belt and the peripheral surfaces of the tape packs. See, for example, U.S. Pat. Nos. 3,907,230 (Merle); 4,146,194 and 4,209,144 (both Majicek); and 4,205,808 (Hartig et al.). In discussing the Merle patent, Hartig says that the floating roller tends to be unstable, thus inflicting instabilities in the belt which in turn inflicts instabilities in the tape. Hartig's solution is to taper the surface of the floating roller to form a frusto-conical shape such that the belt tends to climb to the upper lip of the floating roller.

While also discussing the problem of stabilizing the position of the floating roller, the Majicek patents say that prior belt-driven cartridges of the second type could not rapidly accelerate and decelerate the tape, and that this can be alleviated by employing a belt which is thin enough and sufficiently inelastic against compression that the pressure of the floating roller compresses the tape packs as well as the belt. The Majicek '194 patent employs a floating roller, the width of which is less than the width of the belt, thus helping to stabilize the position of the floating roller. The Majicek '144 patent employs a floating roller that has a rigid periphery and a belt that is thin and inelastic enough to permit the floating roller to press the belt into the tape packs to deform them to produce an appreciable portion of the tape tension.

Although belt-driven, two-reel tape cartridges of the second type were introduced to the market several years ago, they have yet to demonstrate commercial viability.

SUMMARY OF THE INVENTION

The invention provides a belt-driven, two-reel tape cartridge which, as compared to that of the Von Behren patent, has significantly reduced friction and so can be driven by smaller motors and generates less heat.

Like that of the Von Behren patent, the low-friction, belt-driven tape cartridge of the invention has a boxlike enclosure containing a pair of reel hubs supported for rotation on spaced parallel axes, a length of tape convolutely wound on the reel hubs in opposite directions to provide two tape packs, a belt driving roller and a pair of idler rollers, the axes of which are parallel to the axes of the reel hubs, and an elastic belt stretchably entrained around the tape packs, the belt driving roller, and the idler rollers.

The novel tape cartridge differs from that of the Von Behren patent in that:

instead of having fixed positions, each idler roller is journalled on a shaft projecting from a free end of an arm, the other end of which is pivotably mounted in the enclosure, and the elastic belt presses each idler roller against the belt and the underlying tape pack.

Because the idler rollers are supported by pivotable arms, they should have much better stability than do the unsupported idler rollers of the above-discussed second type of belt-driven tape cartridge.

The elastic belt of the Von Behren patent is useful in the novel tape cartridge and preferably is a polyurethane belt having a coefficient of elasticity in the range from 0,005 to 0.05 m/nt m. Likewise, the belt should have a pretension of at least 1.5 nt, preferably from 2 to 5 nt, and an angle of wrap at the reel hubs of at least 60°, preferably at least 90°.

In the novel tape cartridge, the fractional differential in speed between the take-up pack and the supply pack (the take-up ratio $T_r$) is given by the expression $$T_r = \frac{t}{D_1} + \frac{t}{D_r}$$

where t is the belt thickness, $D_1$ is the diameter of the supply pack, and $D_r$ is the diameter of the idler roller that contacts the take-up pack. Preferably $D_r$ is much smaller than $D_1$ and $t/D_r$ is within the range of 0,001 to 0.010 in order to obtain a tape tension sufficient to maintain good head contact without undue wear.

It is postulated that the take-up ratio of the novel tape cartridge is primarily the result of stretching of the outside surface of the belt as it passes over the idler roller adjacent the take-up pack, thus driving the outermost convolution of that tape pack faster than the belt. To a lesser extent, the take-up ratio is the result of compression and slowing of the speed of the inside surface of the belt as it contacts the supply pack.

Hence, the take-up ratio of the novel tape cartridge is obtained in a substantially lossless manner, in contrast to the frictional drag required by the tape cartridge of the Von Behren patent. Other elements of the novel tape cartridge preferably are designed to be as nearly lossless as possible, e.g., by lubricating the bearings of the idler rollers and belt driving roller to minimize friction.

In the preferred embodiments hereinafter described, the tape is a magnetic recording tape.

However, within the scope of the present invention, the term "tape" includes microfilm, paper webs, and other elongated flexible web material which can be transported between a pair of reels.

BRIEF DESCRIPTION OF THE DRAWINGS

The invention may be more easily understood in reference to the drawing, all figures of which are schematic. In the drawing.

Each of FIGS. 1 and 2 is a top view of a belt-driven tape cartridge of the invention.

DESCRIPTION OF THE PREFERRED EMBODIMENTS

Figure 1:
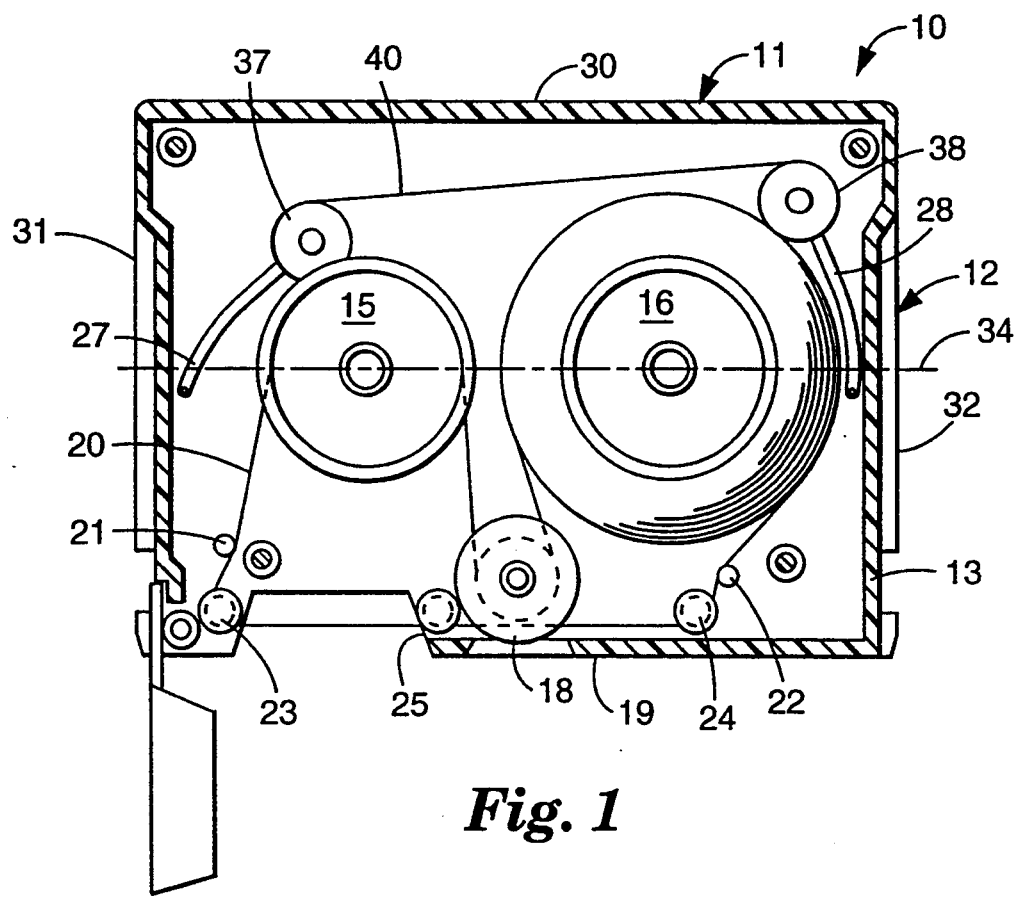

Referring to FIG. 1, a tape cartridge 10 has a boxlike enclosure 11 consisting of a baseplate 12 and a cover 13. Journalled on shafts projecting from the baseplate are a pair of identical reel hubs 15 and 16 and a belt driving roller 18 that is positioned between the reel hubs adjacent a first edge 19 of the enclosure. A length of magnetic recording tape 20 is convolutely wound on the reel hubs in opposite directions and is drawn past a pair of wrap pins 21 and 22 and over a pair of guide pins 23 and 24 to extend along the first edge 19. A cutaway portion 25 allows the tape to be contacted by a recording head (not shown) of a tape recorder.

A pair of arms 27 and 28 are pivotably mounted on the baseplate with their free ends extending toward a second edge 30 of the enclosure which is parallel to the first edge 19. Their pivot points are adjacent the third and fourth edges 31 and 32, respectively, of the enclosure and slightly below a line 34 that intersects the axes of the reel hubs (here sometimes called the "hub line"), i.e., between the hub line and the first edge 19 of the enclosure. Journalled on a shaft projecting from a finger at the free end of each arm 27 and 28 is an idler roller 37 or 38, respectively. The idler rollers are identical to each other, and their axes are parallel to the axes of the reel hubs 15 and 16 and the belt driving roller 18. Each of the arms is gently curved to ensure against contact with the tape 20.

An elastic belt 40 is stretchably entrained around the tape packs, the belt driving roller, and the idler rollers, thus pressing each idler roller against the belt and underlying tape pack.

The shafts on which the idler rollers are journalled preferably have the smallest diameter that affords adequate strength and are lubricated to keep friction to a minimum.

Like that of the Von Behren patent, the belt driving roller 18 has a larger diameter portion that extends over the tape path between the guide pins 23 and 24 to be contacted by a driving roller (not shown) of a tape recorder.

The peripheral surfaces of each idler roller and of the belt-bearing portion of the belt driving roller are crowned to keep the belt centered without edge guides. Although each of the idler rollers and belt driving rollers shown in the Von Behren patent has a central circumferential belt guide slot, crowned rollers have been used in belt-driven tape cartridges manufactured since the patent issued.

Figure 2:
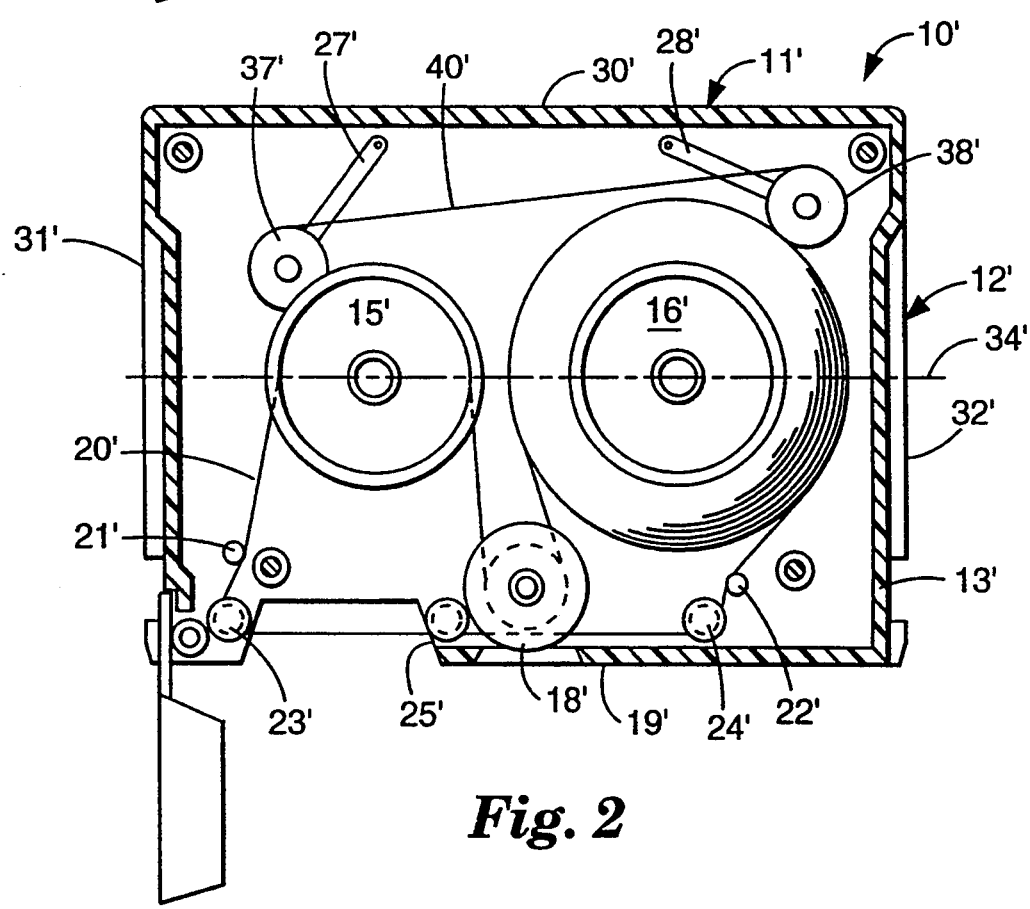

The tape cartridge 10' of FIG. 2 is similar to that of FIG. 1 and comparable parts have the same reference characters except for "prime" marks. The tape cartridge 10' of FIG. 2 differs from that of FIG. 1 in that the pivot points of the two arms 27' and 28' are positioned adjacent the second edge 30' of the enclosure so that the fingers at the free ends of the arms extend toward the third and fourth edges 31' and 32', respectively, of the boxlike enclosure 11'.

EXAMPLE 1

Significant features of a low-friction belt-driven tape cartridge as shown in FIG. 1 are as follows:

| | |
|---|---|
| baseplate 12 | aluminum 2.5 mm thick |
| cover | polycarbonate resin |
| reel hubs 15 and 16 | 40 mm in diameter |
| magnetic recording tape 20 | 200 mm in length |
| maximum tape pack dia. | 73 mm |
| belt driving roller 18 | 17.4 mm in diameter |
| larger diameter portion | 22.6 mm |
| arms 27 and 28 | 43 mm in length from pivot point to axis of idler roller |
| pivot points location | 9.5 mm below the hub line |
| idler rollers 37 and 38 | acetal resin 15.8 mm dia. |
| shafts | hardened steel 1.6 mm in dia. |
| elastic belt 40 | polyurethane 39.2 cm in length, 0.1 mm in thickness |

The installed elastic belt had a pretension of 3.3 nt and minimum and maximum angles of wrap at the reel hubs of about 110° and 170°. The cartridge was operated at tape speeds up to 200 ips (5.1 m/sec) and at start/stop accelerations up to 75 m/sec$^2$ while maintaining a tape tension of at least 0.17 nt throughout a large number of test cycles. At all times, both the belt and tape tracked perfectly. The motor force to attain a tape speed of 2.3 m/sec was 0.7 nt.

Tested for comparison was a belt-driven tape cartridge of the Von Behren patent of the same size. Its elastic belt had a pretension of 4.4 nt, because a pretension of at least about 4.4 nt was required to prevent failure in start/stop operation at tape speeds up to 90 ips (2.3 m/sec). Even at this higher belt pretension (as compared to that of the cartridge of Example 1), the tape tension dropped below zero at a speed of 3.4 m/sec. The motor force to attain a tape speed of 2.3 m/sec was 0.9 nt.

As compared to a belt-driven tape cartridge of the Von Behren patent, it is believed that the novel tape cartridge can be operated at lower belt tension because the idler rollers squeeze out air from under the belt and between the tape convolutions and thus virtually eliminate any danger of slippage such as may be encountered in cartridges of the Von Behren patent at exceedingly high tape speeds.

FIG. 3

Figure 3:
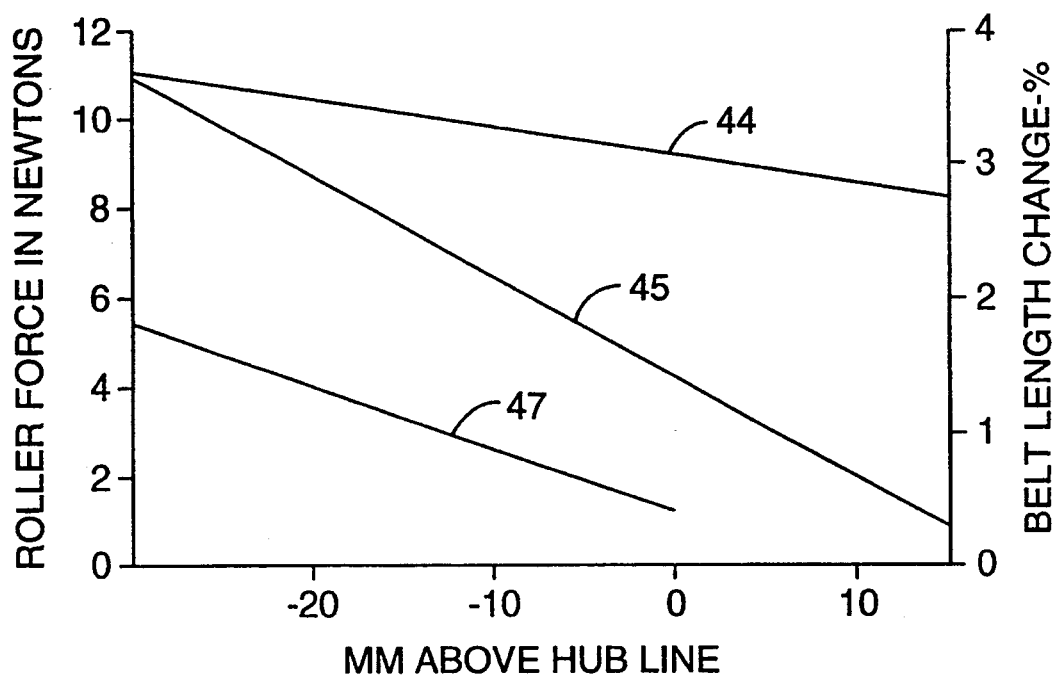
FIG. 3 is a graph showing the effect of pivot point location on the operation of the tape cartridge of FIG. 1.

Ideally, both the force of the idler rollers against the tape packs and the length to which the belt is stretched should both remain constant in spite of changes in the sizes of the tape packs due to transfer of tape from one pack to the other. In FIG. 3, lines 44 and 45 show the maximum and minimum forces exerted by one of the idler rollers against a tape pack at various pivot points along a line parallel to the third and fourth edges 31 and 32. The convergence of those lines indicates a preference to locate the pivot points below the hub line 34, i.e., between the hub line and the second edge 30 of the enclosure. A line 47 shows changes in belt length at the various pivot points and indicates that the change in belt length (and hence the change in tension in the belt) should be zero when the pivot points are above the hub line. Hence there is a compromise in locating the pivot points, preferably slightly below the hub line as in FIG. 1.

FIG. 4

Figure 4:
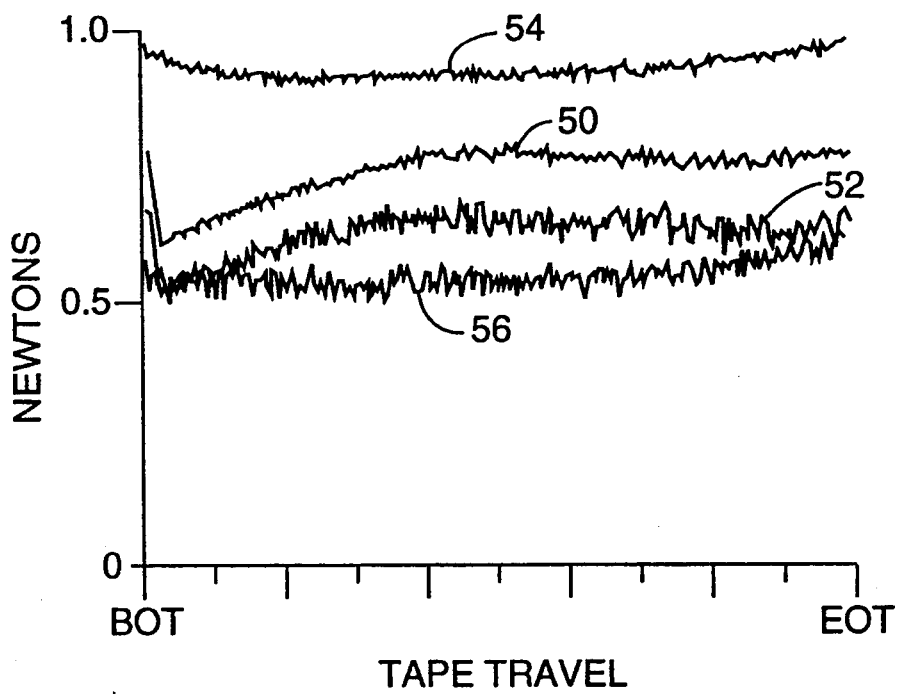
FIG. 4 is a graph comparing the driving forces and tape tensions of the tape cartridge of FIG. 1 and a tape cartridge of the Von Behren patent.

In FIG. 4, line 50 charts the driving force and line 52 charts the tape tension while driving the tape of the cartridge of Example 1 from one reel hub to the other at 2.3 m/sec, i.e., from beginning of tape (Bot) to end of tape (EOT). For comparison, lines 54 and 56 chart the driving force and the tape tension, respectively, of the cartridge of the Von Behren patent at the same tape speed. This comparison shows that to attain approximately the same tape tension, the tape cartridge of Example 1 requires significantly less driving force than does the cartridge of the Von Behren patent.

EXAMPLE 2

A low-friction, belt-driven tape cartridge was constructed as shown in FIG. 2, but was adjudged to be inferior to that of Example 1, because there was some slippage between the belt and the tape.

What is claimed is:

1. A tape cartridge comprising a boxlike enclosure containing:
   a pair of non-removable reel hubs supported for rotation on spaced parallel axes,
   a length of tape convolutely wound on the reel hubs in opposite directions to provide two tape packs,
   a belt driving roller supported within the enclosure for rotation about a stationary axis at a position between the reel hubs adjacent a first edge of the enclosure,
   a pair of arms, one end of each arm being pivotably mounted in the enclosure, with the pivot of each arm positioned near a respective side edge of the enclosure and proximate to a line that intersects the axes of the tape hubs,
   an idler roller journalled on a shaft at the free end of each arm with the axis of each idler roller parallel to the axes of the reel hubs and of the belt driving roller, and
   an elastic belt stretchably entrained around the tape packs, the belt driving roller, and the idler rollers such that the belt presses each idler roller against a belt portion located between each idler roller and each tape pack and against the underlying tape pack.

2. A tape cartridge as defined in claim 1 wherein the pivot points of the arms are between said line and said first edge of the enclosure.

3. A tape cartridge as defined in claim 2 wherein each of the arms is gently curved with its concave side adjacent the tape.

4. A tape cartridge as defined in claim 1 wherein the angle of wrap of the elastic belt around each of the tape packs is at least 90°.

5. A tape cartridge as defined in claim 1 wherein the coefficient of elasticity of the belt is from 0.005 to 0.05 m/nt m.

6. A tape cartridge as defined in claim 5 wherein the elastic belt has a pretension of from 2 to 5 nt.

7. A tape cartridge comprising a boxlike enclosure containing a pair of non-removable reel hubs supported for rotation on spaced parallel axes; a length of tape convolutely wound on the reel hubs in opposite directions; a belt driving roller and a pair of idler rollers, with the axes of the rollers parallel to the axes of the reel hubs; and an elastic belt stretchably entrained around the tape on the hubs the belt driving roller, and the idler rollers; which tape cartridge is characterized in that:
   each idler roller is journalled on a shaft at a free end of an arm, with the other end of each arm pivotably mounted in the enclosure near a respective side edge of the enclosure and proximate to a line that intersects the axes of the tape hubs, and the elastic belt is entrained around the rollers and the tape such that the belt presses each idler roller against a belt portion located between each idler roller and each tape pack and against the underlying tape on the respective hub.

* * * * *

UNITED STATES PATENT AND TRADEMARK OFFICE
CERTIFICATE OF CORRECTION

PATENT NO.: 5,374,004

DATED: December 20, 1994

INVENTOR(S): von Behren

It is certified that error appears in the above-identified patent and that said Letters Patent is hereby corrected as shown below:

Col. 2, line 38, "0,005" should be --0.005--.

Col. 2, line 53, "0,001" should be --0.001--.

Signed and Sealed this

Ninth Day of May, 1995

Attest:

BRUCE LEHMAN

Attesting Officer

Commissioner of Patents and Trademarks